Patented Mar. 10, 1953

2,631,162

UNITED STATES PATENT OFFICE 2,631,162

METHOD OF REACTING ALPHA, ALPHA-POLYHALOGENATED ALKANALS AND ORGANO-PHOSPHORUS COMPOUNDS AND PRODUCTS RESULTING THEREFROM

Elbert C. Ladd and Merlin P. Harvey, Passaic, N. J., assignors to United States Rubber Company, New York, N. Y., a corporation of New Jersey No Drawing. Application September 13, 1949,
Serial No. 115,555

9 Claims. (Cl. 260—461)

This invention relates to a new class of compounds and to a process of making the same. Still more particularly, the invention relates to certain novel organo-phosphorus compounds prepared by reacting an alpha, alpha-polyhalogenated alkanal and an organo-phosphorus compound having the formula RR′P—OR* where R and R′ are selected from the group consisting of alkyl, alkenyl, aryl, aralkyl, alkoxy, alkenoxy, aryloxy and aralkoxy radicals and where R* is selected from the group consisting of alkyl, alkenyl and aralkyl radicals, whereby the compound R*-halogen is formed as a by-product and a RR′P(O)—group is introduced in the polyhalogenated alkanal while a halogen atom is eliminated.

It is known that hypophosphorus acid, $HP(OH)_2$, adds slowly to certain carbonyl compounds, including alkanals, to yield alpha-hydroxy organo-phosphonic acids. It is known, however, that certain organo-phosphorus compounds such as trialkyl phosphines $(R_3P)$ will not react with chloral. We have now discovered that alpha, alpha-polyhalogenated alkanals will react rapidly and exothermically with organo-phosphorus compounds of the type RR′P—OR* (as defined above and in more detail below), to form compounds of the type RR′P(O)-(dehalogenoalkanal residue), with elimination of the compound R*-halogen as a by-product. We have further discovered that triaryl phosphites, e. g., triphenyl phosphite, are virtually inoperative in our process, although the analogous trialkyl phosphites, e. g., triethyl phosphite, are highly reactive. Even the alkyl diaryl phosphites will participate in our reaction, albeit with reduced vigor.

The halogen in the polyhalogenated alkanal is almost invariably either chlorine or bromine. Usually all of the halogen atoms in the alkanal will be the same.

In the case of polyhalogenated alkanals which contain chlorine or bromine in the alpha position only, such as chloral or bromal, the reaction products of our invention are only those wherein a RR′P(O)—group is attached to the alpha carbon atom in place of a chlorine or bromine atom previously occupying this position. Thus in the case of chloral and bromal the reaction products of our invention have the formula

RR′P(O)—CX₂—CHO where R and R′ are as defined herein and X is chlorine or bromine.

Where the alpha, alpha-polyhalogenated alkanal employed contains halogen in the alpha position only, the reaction is as follows:

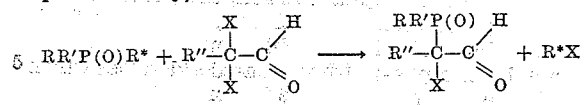

where R, R′ and R* are as before, R″ is either halogen, hydrogen, alkyl, or haloalkyl, and X is halogen (either chlorine or bromine).

In the case of polyhalogenated alkanals containing other chloride or bromide in addition to the two or three chlorine or bromine atoms in the alpha position, such as 2,2,3-trichlorobutanal, the exact structure of the reaction products obtained by our invention is at present uncertain because of the uncertainty of the location of the halogen atom replaced by a RR′P(O)— group or groups. As is illustrated by Example 10 below, substitution of two chlorine atoms in 2,2,3-trichlorobutanal with RR′P(O)—groups may be caused to take place, although the question as to which two of the three chlorine atoms present are involved has not yet been answered.

Suitable organo-phosphorus reactants of the type RR′P—OR* are those in which R and R′ may each be a radical from the class of alkyl (e. g., methyl, ethyl, beta-chloroethyl, beta-ethoxyethyl, beta-butoxyethyl, propyl, isopropyl, beta-chloropropyl, beta-chloro - alpha - methylpropyl, butyl, isobutyl, beta-chlorobutyl, amyl, hexyl, cyclohexyl, heptyl, octyl, nonyl, decyl, hendecyl, dodecyl), alkenyl (e. g., 2-propenyl), aryl (e. g., phenyl, p-chlorophenyl, tolyl, xylyl, 2,5-dichlorophenyl, naphthyl), aralkyl (e. g., benzyl, beta-phenylethyl) and the corresponding alkoxy, alkenoxy, aryloxy, and aralkoxy groups (e. g., methoxy, ethoxy, beta-chloroethoxy, 2-propenoxy, phenoxy, p-chlorophenoxy, benzyloxy); and R* is an alkyl, alkenyl or aralkyl group as previously defined and particularly a lower alkyl group. Illustrative of such compounds are $(C_2H_5O)_3P$, $(Cl—CH_2—CH_2O)_3P$, $C_6H_5—P(OCH_3)_2$, $Cl—C_6H_4—P(OC_2H_5)_2$
$(C_4H_9O)_3P, [(CH_3)_2CH—O—]_3P$
$(CH_2=CH—CH_2—O)_3P$
$Cl—C_6H_4—P—(OC_2H_4Cl)_2$
$C_6H_5—P(O—CH_2—CH_2—Cl)_2$
$C_4H_9—P(OC_4H_9)_2$, $(C_4H_9)_2P—OC_2H_5$
$(C_6H_5)_2—P—OC_2H_5$
$C_6H_5—CH=CH—P(OC_2H_5)_2$
$(CH_3)_2CCl—CH_2—P(OCH_3)_2$
$(CH_3)_2C=CH—P(OCH_3)_2$
$C_6H_5—P(OCH_3)—O—C_6H_5$
$C_4H_9O—CH_2—CH_2O—P(OCH_3)_2$
$(ClC_2H_4O)_2POCH_2—CHCl—CH_3$ $C_6H_{11}O-P(OC_2H_5)_2$, $(C_6H_5)_2P-OCH_3$, and $C_6H_5O-CH_2-CH_2O-P(OCH_3)_2$.

A limitation upon the organo-phosphorus compounds which may be employed in practicing our invention is that when R, R' or R* is attached to phosphorus through oxygen, the carbon atom through which the attachment to P through oxygen is effected must not be a tertiary carbon atom. To state this in another way, where we use phosphorus compounds as starting materials wherein there are organic radicals bound to oxygen which is in turn bound to phosphorus, the carbon atoms bound to oxygen must be primary or secondary if they are part of an aliphatic chain.

Among the operable alpha, alpha-polyhalogenated alkanals which may be employed in the practice of our invention, the alpha-polychlorinated alkanals, particularly those containing at least three chlorine atoms of which at least two are in the alpha position, are preferred, including chloral, 2,2-dichloropropanal, 2,2-dichlorobutanal, 2,2,3-trichlorobutanal etc. Examples of alpha-polybrominated aldehydes which may be used are bromal, 2,2-dibromoethanal, etc.

In the practice of our invention, as it is usually carried out, one mol of alpha,alpha-polyhalogenated alkanal is admixed with one or more mols of the organo-phosphorus compound described above. The latter reactant is usually employed in an amount ranging from 1 to 5 mols per mol of the halogenated alkanal. The intensity of the exothermic reaction which takes place upon mixing the two reactants will vary somewhat with the specific reactants and proportions employed. Usually the reaction will be carried out at temperatures ranging from 25° C. to 150° C. and more commonly at temperatures of from 50° C. to 120° C. It is usually unnecessary to supply heat in order to cause attainment of reaction temperature. However, in some cases a moderate amount of heat may be supplied to further speed up the reaction. The reactions are of brief duration in all cases. Reaction times in excess of 15 hours are seldom, if ever, necessary, while times in the range of 0.5 to 5.0 hours usually suffice. The reaction products are conveniently isolated and purified as by fractional distillation or by preferential extraction.

Our new products are useful in the formulation of wetting agents, plasticizers, pharmaceuticals and flame-proofing compositions.

The following examples disclose our invention in more detail.

EXAMPLE 1

To a stirred solution of 49.13 g. of chloral (2,2,2-trichloroethanal) in 100 ml. of dioxane are slowly added 55.39 g. of triethyl phosphite. The addition requires about 2 hours at a rate which maintains the exothermic reaction at about 50° C. Ethyl chloride is evolved throughout the reaction.

The reaction mixture is thereafter fractionally distilled to yield 56.1 g. of a new compound which is a water-white liquid, B. 102–4° C./2.3 mm.; $n_D^{20}$ 1.4487.

*Analysis*

Found: Chlorine=28.32%; phosphorus=12.53%.
Theory (for $C_6H_{11}Cl_2O_4P$): Chlorine=28.47%; phosphorus=12.44%.

When triethyl phosphite is heated with chloral diacetate in place of chloral, little or no reaction occurs.

EXAMPLE 2

In the manner of Example 1, 83.44 g. of tributyl phosphite are reacted with 49.13 g. of chloral and, after admixture is complete, the reaction mixture is refluxed gently for 0.5 hour. Fractional distillation of the reaction mixture yields 46.4 g. of a new compound which is a colorless liquid, B. 116–118° C./0.25 mm.; $n_D^{20}$ 1.4472, together with some higher boiling product.

*Analysis*

Found: Chlorine=20.13%; phosphorus=10.87%.
Theory (for $C_{10}H_{19}Cl_2O_4P$): Chlorine=23.24%; phosphorus=10.15%.

EXAMPLE 3

The addition of 26.95 g. of tri(beta-chloroethyl)phosphite to 14.74 g. of chloral in the course of 1 hour produces an exothermic reaction which maintains the mixture at 70–80° C. Fractional distillation of the reaction mixture yields 25.7 g. of a new liquid compound, B. 138° C./0.4 mm.; $n_D^{20}$ 1.4850.

*Analysis*

Found: Chlorine=44.04%; phosphorus=9.74%.
Theory ($C_6H_9Cl_4O_4P$): Chlorine=44.61%; phosphorus=9.74%.

EXAMPLE 4

In the manner of Example 3 above, 25.03 g. of tributyl phosphite are reacted with 17.54 g. of 2,2,3-trichlorobutanal during the course of 2 hours at about 70° C. The reaction is completed by heating at about 110° C. for 3 hours after which the unreacted starting materials are removed by evacuating the reaction mixture at 110° C./0.9 mm. The liquid residue, amounting to 33.6 g. is a new compound ($n_D^{20}$ 1.4665).

*Analysis*

Found: Chlorine=19.91%; phosphorus=10.47%.
Theory ($C_{12}H_{23}Cl_2O_4P$): Chlorine=21.28%; phosphorus=9.29%.

EXAMPLE 5

In the manner of Example 3, 41.64 g. of triisopropyl phosphite are reacted with 29.48 g. of chloral for about 1 hour at 60° C. to yield 37.2 g. of a new liquid compound, B. 87–8° C./0.5 mm.; $n_D^{20}$ 1.4440.

*Analysis*

Found: Chlorine=25.36%; phosphorus=11.31%.
Theory ($C_9H_{15}Cl_2O_4P$): Chlorine=25.59%; phosphorus=11.18%

EXAMPLE 6

From the reaction of 41.86 g. of tri(2-ethylhexyl) phosphite with 14.74 g. of chloral at 55–60° C. during 0.75 hour are obtained 42.0 g. of liquid compound, $n_D^{20}$ 1.4563, after concentration in vacuo at 150° C./0.4 mm.

*Analysis*

Found: Chlorine=15.94%; phosphorus=7.60%
Theory ($C_{18}H_{35}Cl_2O_4P$): Chlorine=16.99%; phosphorus=7.42%

EXAMPLE 7

Fifteen and eighty-eight hundredths grams of di(2-chloroethyl) p-chlorophenyl phosphite are gradually added to 8.11 g. of chloral during 0.5 hour. The reaction is perceptibly less exothermic than the trialkyl phosphite examples above although a reaction temperature of 54° C. is easily attained. The reaction mixture is concentrated in vacuo (120° C./0.4 mm.) to 17.9 g. of residual liquid, which is a new compound, $n_D^{20}$ 1.5298.

*Analysis*

Found: Chlorine=38.39%; phosphorus=8.66%
Theory ($C_{10}H_9Cl_4O_4P$): Chlorine=38.75%; phosphorus=8.46%

EXAMPLE 8

The reaction of 17.67 g. of 2-chloroethyl di(p-chlorophenyl) phosphite with 8.11 g. of chloral in the course of 0.5 hour attains a temperature of about 65° C. although it is noticeably less exothermic than that of Example 7 above. The reaction mixture is subsequently concentrated in vacuo evacuated (120° C./0.4 mm.) to 20.1 g. of a residual liquid which is a new compound, $n_D^{20}$ 1.5598.

*Analysis*

Found: Chlorine=34.28%; phosphorus=7.65%
Theory ($C_{14}H_9Cl_4O_4P$): Chlorine=34.25%; phosphorus=7.48%

EXAMPLE 9

Twenty-six and seventy-one hundredths grams of di(2-chloroethyl) benzenephosphonate is added dropwise and with stirring to 16.21 g. of chloral in the course of 1 hour, the temperature being maintained at ca. 70-5° C. by adjusting the addition rate. The reaction mixture is concentrated in vacuo to remove the ethylene chloride leaving 28.8 g. of crude liquid residue, $n_D^{20}$ 1.5400.

*Analysis*

Found: Chlorine=31.32%; phosphorus=12.20%
Theory ($C_{10}H_{10}Cl_3O_3P$): Chlorine = 33.71%; phosphorus=9.82%

EXAMPLE 10

The dropwise addition of 26.95 gms. of tri(2-chloroethyl) phosphite to 17.54 gms. of 2,2,3-trichlorobutanal during the course of 1.5 hours results in an exothermic reaction which maintains the temperature of the mixture at 50–65°. Subsequent concentration in vacuo of the mixture at 120°/0.4 mm. leaves 24.9 gms. of a residual liquid, which is a new compound, $n_D^{20}$ 1.4895.

*Analysis*

Found: Chlorine=34.45%; phosphorus=12.30%
Theory ($C_{12}H_{21}Cl_5O_7P_2$): Chlorine = 34.32%; phosphorus=11.88 %

*Molecular weight*

Found: 501
Theory ($C_{12}H_{21}Cl_5O_7P_2$): 516

The following Examples 11–16 were run under the same conditions as Example 1.

EXAMPLE 11

Reaction of 2,2,3-trichlorobutanal with triethyl phosphite to give a new compound.

*Analysis*

Found: Chlorine=24.17%; phosphorus=11.99%
Theory (for $C_8H_{15}Cl_2O_4P$): Chlorine=25.59%; phosphorus=11.18%

EXAMPLE 12

Reaction of tri(2-chloro-2-methylpropyl) phosphite with chloral to give a new compound.

*Analysis*

Found: Chlorine=40.55%; phosphorus=7.93%
Theory (for $C_{16}H_{17}Cl_4O_4P$): Chlorine=37.92%; phosphorus=8.28%

EXAMPLE 13

Reaction of tri(2-chloro-3-butenyl) phosphite and chloral.

*Analysis*

Found: Chlorine=35.53%; phosphorus=8.01%
Theory (for $C_{10}H_{13}Cl_4O_4P$): Chlorine=38.33%; phosphorus=8.37%

EXAMPLE 14

Reaction of tri(2-chloropropyl) phosphite and chloral.

*Analysis*

Found: Chlorine=40.11%; phosphorus=9.31%
Theory (for $C_8H_{13}Cl_4O_4P$): Chlorine=40.99%; phosphorus=8.95%

EXAMPLE 15

Reaction of di(2-chloroethyl) 2-chloro-2-methyl-propyl phosphite and chloral.

*Analysis*

Found: Chlorine=40.96%; phosphorus=10.28%
Theory (for $C_8H_{13}Cl_4O_4P$): Chlorine=40.99%; phosphorus=8.95%

EXAMPLE 16

Reaction of triethyl phosphite and bromal.

*Analysis*

Found: Bromine=43.13%; phosphorus=10.24%
Theory (for $C_6H_{11}Br_2O_4P$): Bromine=47.29%; phosphorus=9.17%

Having thus described our invention, what we claim and desire to protect by Letters Patent is:

1. An alpha-(dialkyl-phosphono)-alpha, alpha-dihaloacetaldehyde, the halogen content of which is selected from the group consisting of chlorine and bromine.

2. Alpha-(diethyl-phosphono)-alpha, alpha-dichloroacetaldehyde.

3. Alpha-(2-chloroethyl p-chlorophenyl phosphono)-alpha, alpha-dichloroacetaldehyde.

4. Alpha - [di(2 - chloroethyl) phosphono] - alpha, alpha-dichloroacetaldehyde.

5. Alpha - [di(2 - chloro - 3 - butenyl)phosphono]-alpha, alpha-dichloroacetaldehyde.

6. The process which comprises commingling an alpha, alpha-polyhalogenated alkanal, the halogen content of which is selected from the group consisting of chlorine and bromine, and an organic phosphite having the formula RR'P—O—R* wherein R and R' are selected from the group consisting of alkoxy, chloroalkoxy and chloroaryloxy radicals and R* is selected from the group consisting of alkyl and chloroalkyl radicals, the carbon atom bound to oxygen in said radicals being selected from the group consisting of primary and secondary carbon atoms when part of an aliphatic chain, at a temperature of from 25° C. to 150° C., and thereby effecting replacement of a halogen atom in said alkanal with a RR'P(O)— group, and recovering the phosphono-substituted alkanal thereby formed from the resulting reaction mixture.

7. The process which comprises commingling chloral and a trialkyl phosphite at a temperature of from 25° C. to 150° C., and thereby effecting replacement of a chlorine atom in said chloral with a dialkyl phosphono group, and recovering an alpha-(dialkyl phosphono)-alpha, alpha-dichloroacetaldehyde from the resulting reaction mixture.

8. A phosphono derivative of an alpha, alpha-polyhalogenated alkanal, the halogen content of said alpha, alpha-polyhalogenate alkanal being selected from the group consisting of chlorine and bromine, said derivative having in place of one of the halogen atoms of said alpha, alpha-polyhalogenated alkanal a RR'P(O)— group wherein R and R' are selected from the group consisting of alkoxy, chloroalkoxy, and chloroaryloxy radicals, the carbon atom bound to oxygen in said radicals being selected from the group consisting of primary and secondary carbon atoms when part of an aliphatic chain.

9. A phosphono derivative of 2,2,3-trichlorobutanal, said derivative having in place of one of the chlorine atoms of said 2,2,3-trichlorobutanal a diethyl phosphono group.

ELBERT C. LADD.
MERLIN P. HARVEY.

REFERENCES CITED

The following references are of record in the file of this patent:

Drake et al., J. Org. Chem., vol. 2, pp. 387–399 (1937).